US012149022B2

(12) United States Patent
Burrow et al.

(10) Patent No.: US 12,149,022 B2
(45) Date of Patent: Nov. 19, 2024

(54) SUBSEA CONNECTOR

(71) Applicant: Siemens Energy Global GmbH & Co. KG, Munich (DE)

(72) Inventors: Christopher Burrow, Ulverston (GB); Daniel Walton, Carnforth (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 373 days.

(21) Appl. No.: 17/694,798

(22) Filed: Mar. 15, 2022

(65) Prior Publication Data

US 2022/0302635 A1 Sep. 22, 2022

(30) Foreign Application Priority Data

Mar. 17, 2021 (GB) ..................................... 2103663
Mar. 17, 2021 (GB) ..................................... 2103664
Mar. 17, 2021 (GB) ..................................... 2103666
Mar. 17, 2021 (GB) ..................................... 2103667
Mar. 17, 2021 (GB) ..................................... 2103668
Mar. 17, 2021 (GB) ..................................... 2103669

(51) Int. Cl.
*H01R 13/523* (2006.01)
*H01R 13/24* (2006.01)
(Continued)

(52) U.S. Cl.
CPC ....... *H01R 13/523* (2013.01); *H01R 13/2421* (2013.01); *H01R 13/2471* (2013.01);
(Continued)

(58) Field of Classification Search
CPC .............. H01R 13/523; H01R 13/2421; H01R 13/2471; H01R 13/502; H01R 13/5202;
(Continued)

(56) References Cited

U.S. PATENT DOCUMENTS 3,742,427 A 6/1973 Ballard
4,142,770 A * 3/1979 Butler, Jr. ............ H01R 13/523 439/140

(Continued)

FOREIGN PATENT DOCUMENTS

FR 2895577 A1 6/2007
GB 2338119 A 12/1999
WO 2021037949 A1 3/2021

*Primary Examiner* — Abdullah A Riyami
*Assistant Examiner* — Nelson R. Burgos-Guntin
(74) *Attorney, Agent, or Firm* — Wolter Van Dyke Davis, PLLC

(57) ABSTRACT

A subsea wet mateable connector includes a plug and a receptacle. The plug includes a plug body and a shuttle pin moveably mounted in a socket contact. The receptacle includes a receptacle body and a receptacle pin. The connector further including a secondary diaphragm mounted to the plug body and a primary diaphragm mounted to the plug body outside the secondary diaphragm. The primary diaphragm and secondary diaphragm are spaced from one another in a demated state, allowing fluid flow in the space formed therebetween. The primary diaphragm and secondary diaphragm are sealingly engaged in a mated state, forming a continuous protective layer over the receptacle pin in a mated state.

15 Claims, 7 Drawing Sheets

(51) Int. Cl.

| | |
|---|---|
| ***H01R 13/502*** | (2006.01) |
| ***H01R 13/52*** | (2006.01) |
| ***H01R 13/533*** | (2006.01) |
| ***H01R 13/627*** | (2006.01) |
| ***H01R 13/629*** | (2006.01) |
| ***H01R 24/86*** | (2011.01) |
| *H01R 13/02* | (2006.01) |
| *H01R 13/622* | (2006.01) |
| *H01R 13/6582* | (2011.01) |
| *H01R 13/66* | (2006.01) |

(52) U.S. Cl.

CPC ....... *H01R 13/502* (2013.01); *H01R 13/5202* (2013.01); *H01R 13/521* (2013.01); *H01R 13/5219* (2013.01); *H01R 13/5227* (2013.01); *H01R 13/533* (2013.01); *H01R 13/6271* (2013.01); *H01R 13/629* (2013.01); *H01R 13/62961* (2013.01); *H01R 24/86* (2013.01); *H01R 13/02* (2013.01); *H01R 13/52* (2013.01); *H01R 13/622* (2013.01); *H01R 13/627* (2013.01); *H01R 13/6582* (2013.01); *H01R 13/6675* (2013.01); *H01R 2201/04* (2013.01); *H01R 2201/26* (2013.01)

(58) Field of Classification Search

CPC ............ H01R 13/5219; H01R 13/5227; H01R 13/533; H01R 13/6271; H01R 13/629; H01R 13/62961; H01R 24/86; H01R 13/622; H01R 13/6675; H01R 2201/04; H01R 2201/26; H01R 13/6582; H01R 13/02; H01R 13/521

See application file for complete search history.

(56) References Cited

U.S. PATENT DOCUMENTS

| | | | | |
|---|---|---|---|---|
| 5,194,012 | A * | 3/1993 | Cairns | H01R 13/523 439/271 |
| 5,645,438 | A * | 7/1997 | Cairns | H01R 13/523 439/201 |
| 5,645,442 | A * | 7/1997 | Cairns | H01R 13/523 439/271 |
| 6,332,787 | B1 * | 12/2001 | Barlow | H01R 13/5227 439/138 |
| 6,464,405 | B2 | 10/2002 | Cairns et al. | |
| 7,959,454 | B2 * | 6/2011 | Ramasubramanian | H01R 13/523 439/201 |
| 9,772,452 | B1 * | 9/2017 | Toth | G02B 6/3849 |
| 10,014,678 | B2 | 7/2018 | Barrett et al. | |
| 10,704,353 | B2 | 7/2020 | Painter et al. | |
| 2005/0016769 | A1 * | 1/2005 | Wallace | H01R 13/523 175/45 |
| 2007/0259568 | A1 | 11/2007 | Mackillop et al. | |
| 2015/0325997 | A1 * | 11/2015 | Burrow | H02G 15/013 29/858 |
| 2016/0276775 | A1 * | 9/2016 | Nicholson | H01R 13/17 |
| 2017/0005448 | A1 * | 1/2017 | Williams | G02B 6/4428 |
| 2020/0287318 | A1 * | 9/2020 | Vassgård | H01R 13/5227 |

* cited by examiner

SUBSEA CONNECTOR

CROSS REFERENCE TO RELATED APPLICATIONS

This application claims the benefit of United Kingdom Application Nos. GB 2103663.7, GB 2103664.5, GB 2103666.0, GB 2103667.8, GB 2103668.6, GB 2103669.4 all filed on 17 Mar. 2021, and all incorporated by reference herein in their entirety.

FIELD OF INVENTION

This invention relates to a subsea, or underwater, connector and a method of operating the connector.

BACKGROUND OF INVENTION

Subsea, or underwater, connectors are designed to operate beneath the surface of the water. Typically, a subsea connector comprises two parts, generally known as plug and receptacle. The receptacle may include one or more conductor pins and the plug may include corresponding plug sockets for the receptacle conductor pins. The connection may be made topside (dry-mate), or subsea (wet-mate) and the specific design is adapted according to whether the connector is a wet-mate or dry-mate connector. Subsea connectors have various applications including power connectors which supply power to subsea equipment, or control and instrumentation connectors which exchange data between different pieces of subsea equipment, or between subsea equipment and topside devices.

SUMMARY OF INVENTION

In accordance with a first aspect of the present invention, a subsea wet mateable connector comprises a plug and a receptacle; wherein the plug comprises a plug body and a shuttle pin moveably mounted in a socket contact; wherein the receptacle comprises a receptacle body and a receptacle pin; the connector further comprising a secondary diaphragm mounted to the plug body; and a primary diaphragm mounted to the plug body outside the secondary diaphragm; wherein the primary diaphragm and secondary diaphragm are spaced from one another in a demated state, allowing fluid flow in the space formed therebetween; and wherein the primary diaphragm and secondary diaphragm are sealingly engaged in a mated state, forming a continuous protective layer over the receptacle pin in a mated state.

The shuttle pin may be located within the plug body in the mated state and is sealing engaged with orifices in both of the primary and secondary diaphragms in the demated state.

This design increases reliability of the connector in use and reduces cost of manufacture.

The profile of the shuttle pin may be adapted to engage with a shoulder formed in a corresponding surface at least one of the primary diaphragm and of the secondary diaphragm.

The shuttle pin engaging with a shoulder of the primary diaphragm enables movement of the shuttle pin in response to movement of the receptacle pin during mating and demating to cause corresponding movement of the primary and secondary diaphragm seals.

The primary diaphragm seals may comprise a double taper angle.

This helps to compensate for stretch or compression over the shuttle pin whilst maintaining the correct cone geometry.

The secondary diaphragm seals may comprise a pair of walls with an integral void, in particular walls formed with a Y, U, or C shaped geometry.

This helps to prevent inter seal packing when the shuttle pin fitment causes diametrical stretch of the thin membrane front of the diaphragm.

A primary dielectric fluid chamber may be formed between the primary and secondary diaphragms.

A secondary dielectric fluid chamber may be formed within the plug body.

The primary diaphragm may further comprise one or more compliant return springs, in particular elastomeric diaphragm cone springs.

Insertion of the receptacle pin into the shuttle pin during mating results in a continuous jacket being formed over the receptacle pin down to its root by engagement with the surfaces of the primary and secondary diaphragms either side of the orifices.

A root cone seal protrusion of the receptacle pin may be adapted to engage with a surface of the primary diaphragm.

This allows for connector mating overstroke.

BRIEF DESCRIPTION OF THE DRAWINGS

An example of a subsea connector and associated method of operation in accordance with the present invention will now be described with reference to the accompanying drawings in which.

DETAILED DESCRIPTION OF INVENTION

The drive to reduce overall lifecycle costs, both capital expenditure (CAPEX) and operational expenditure (OPEX), associated with new deep-water oil and gas developments means that improvements to existing designs, manufacturing processes and operation are desirable. Subsea connector systems are desired that have a lower cost, can be relatively quickly and easily installed and that have reduced maintenance requirements, or need for intervention which affects the systems to which they are connected throughout their working life. Thus, connectors which continue to perform without degradation, over a longer period of time, are desirable.

Typically, connectors for different applications may be single or multi-way connectors. For example, a 4-way connector may be used for delivering power, or a 12-way connector for data transfer via a suitable subsea instrumentation interface standard. This may be level 1, for analogue devices, level 2 for digital serial devices, e.g CANopen, or level 3. using Ethernet TCP/IP. Other data connectors, include optical fibre connectors. Wet mateable controls connectors typically have large numbers of thin conductor pins, in order that multiple control signals to different parts of a product can be included in a single control cable. For example, multiple subsea sensors on different pieces of equipment, such as flow sensors, temperature sensors, or pressure sensors each need to have a separate communication path, so that they can be interrogated, monitored and if necessary actuators can be energised, for example to open or close a valve, or to start or stop a pump. Power transmission may be required for the purpose of supplying power to subsea equipment to enable it to operate, for example to close a valve, or drive a pump. Wet mateable power connectors may have a single pin and socket arrangement, or may be multi-way connectors, but typically with fewer, larger, pins than a control or communications connector.

Figure 1:
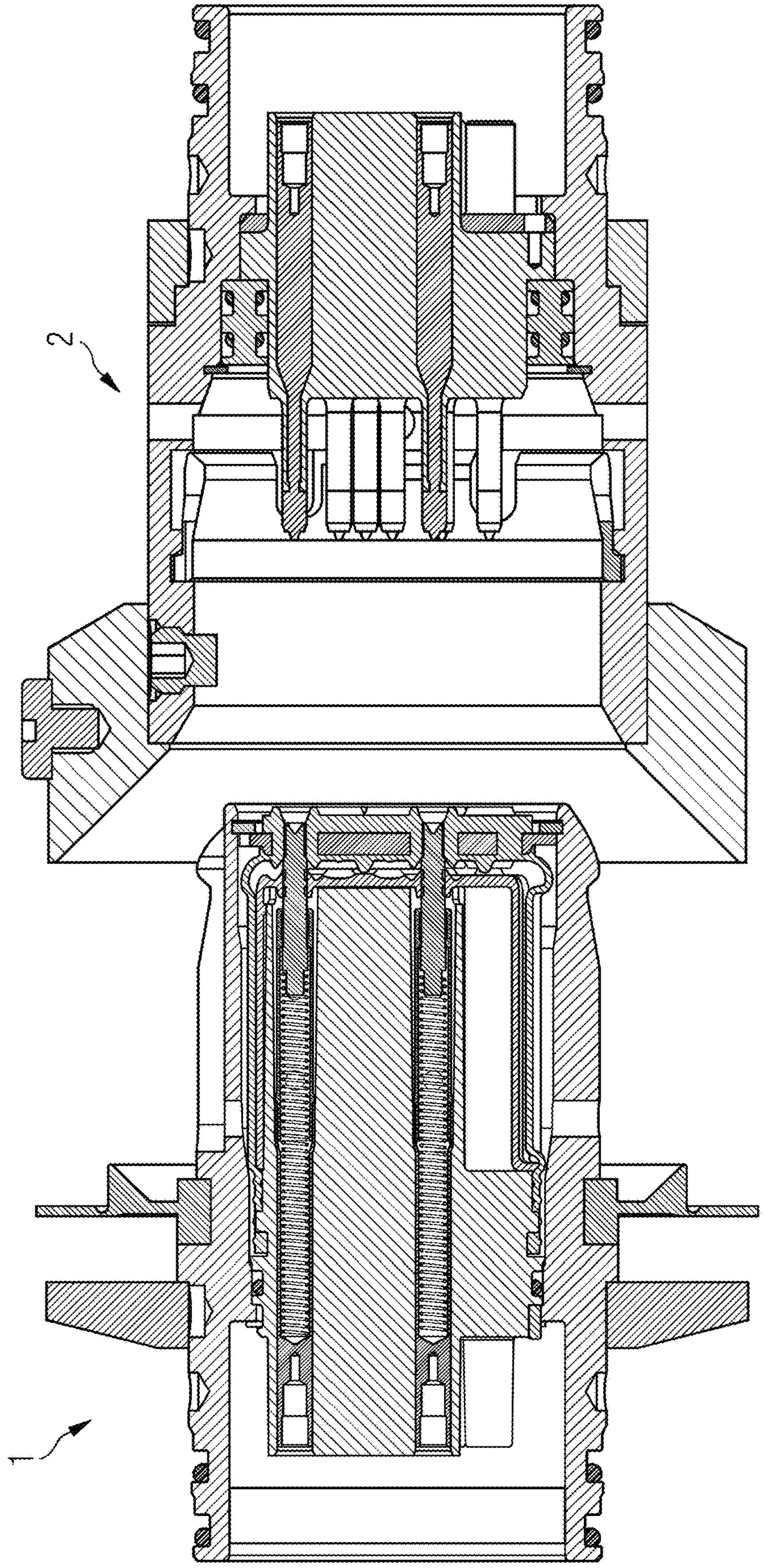
FIG. 1 illustrates a plug and receptacle in cross section, in the pre-mate position.
Figure 2:
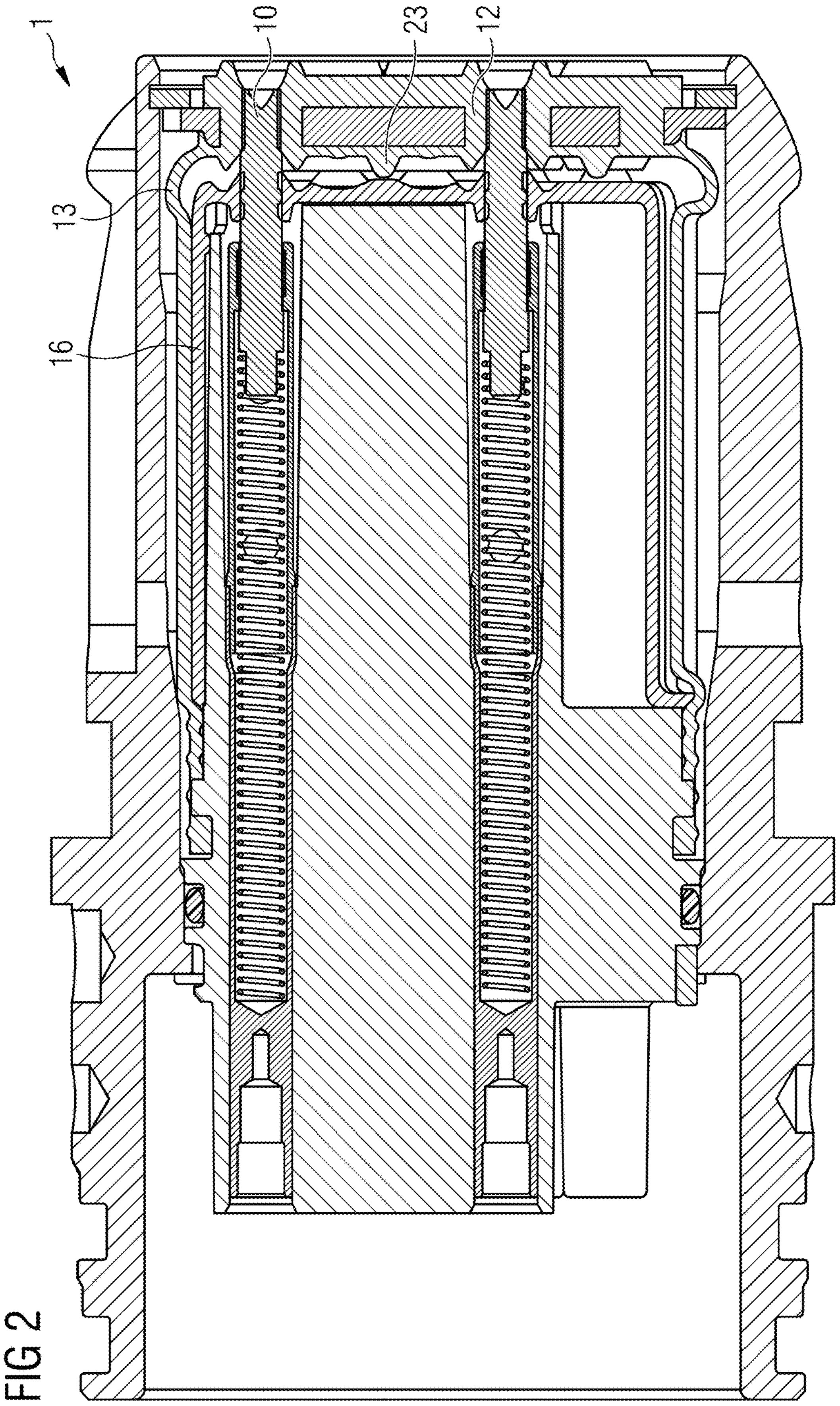
FIG. 2 shows more detail of the plug in cross section.
Figure 3:
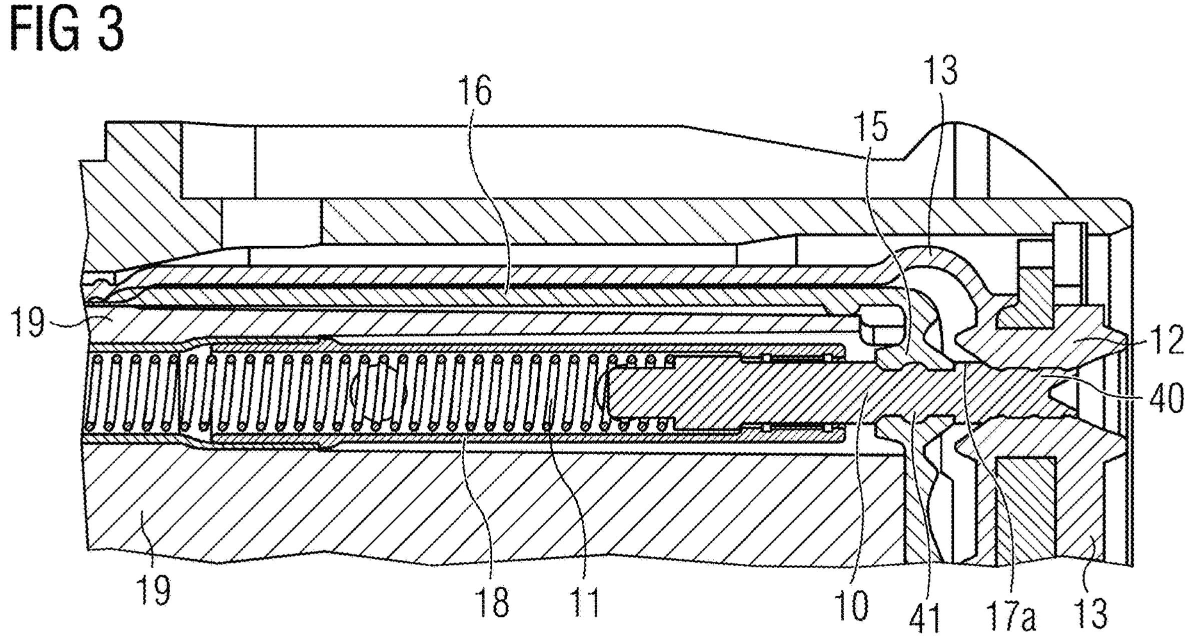
FIG. 3 shows more detail of the plug of FIG. 2.

The present invention provides an improvement to connector plug and receptacle design for greater reliability in use and reduced cost of manufacture. FIG. 1 illustrates a typical plug 1 and receptacle 2. FIGS. 2 and 3 illustrate the plug in more detail. A shuttle pin 10 is mounted for movement on a shuttle pin spring 11. The shuttle pin spring is mounted in a socket contact sub-assembly 18 and plug moulded body 19. An end 40 of the shuttle pin remote from the shuttle pin spring 11 seals against a primary diaphragm front seal 12 of a primary diaphragm 13 mounted on the plug, whilst another section 41 of the shuttle pin 10 seals against a secondary diaphragm seal 15 of a secondary diaphragm 16 mounted on the plug. As can be seen in FIG. 3, a gap 17*a* is formed between the primary diaphragm seal 12 and the secondary diaphragm seal 15. A profile of the shuttle pin 10 changes along its length, in particular, forming a shoulder against corresponding surfaces of the front seal 12 and back seal 15.

Figure 4:
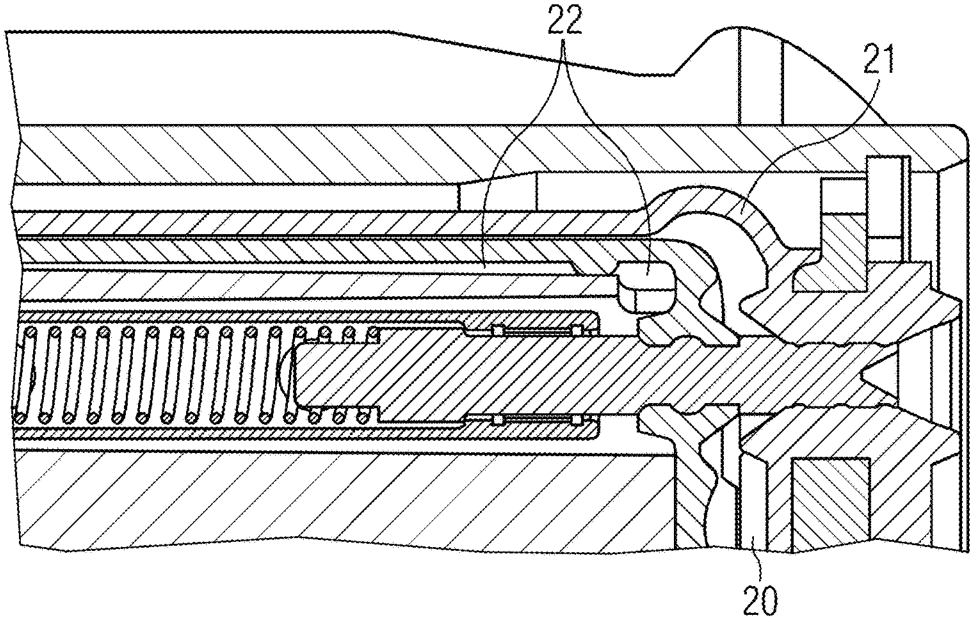
FIG. 4 shows more detail of the plug of FIG. 2.

FIG. 4 shows more detail of the relationship of the seals 12, 15 to the shuttle pin 10. A primary dielectric oil chamber 20 is formed between the two diaphragms 13, 16 and a secondary dielectric oil chamber 22 is formed within the plug moulded body 19. Curvature 21 in the primary diaphragm 13 gives axial compliancy. FIGS. 1 to 4 illustrates the plug shuttle pins and seals before mating with the receptacle of the connector takes place.

Figure 5:
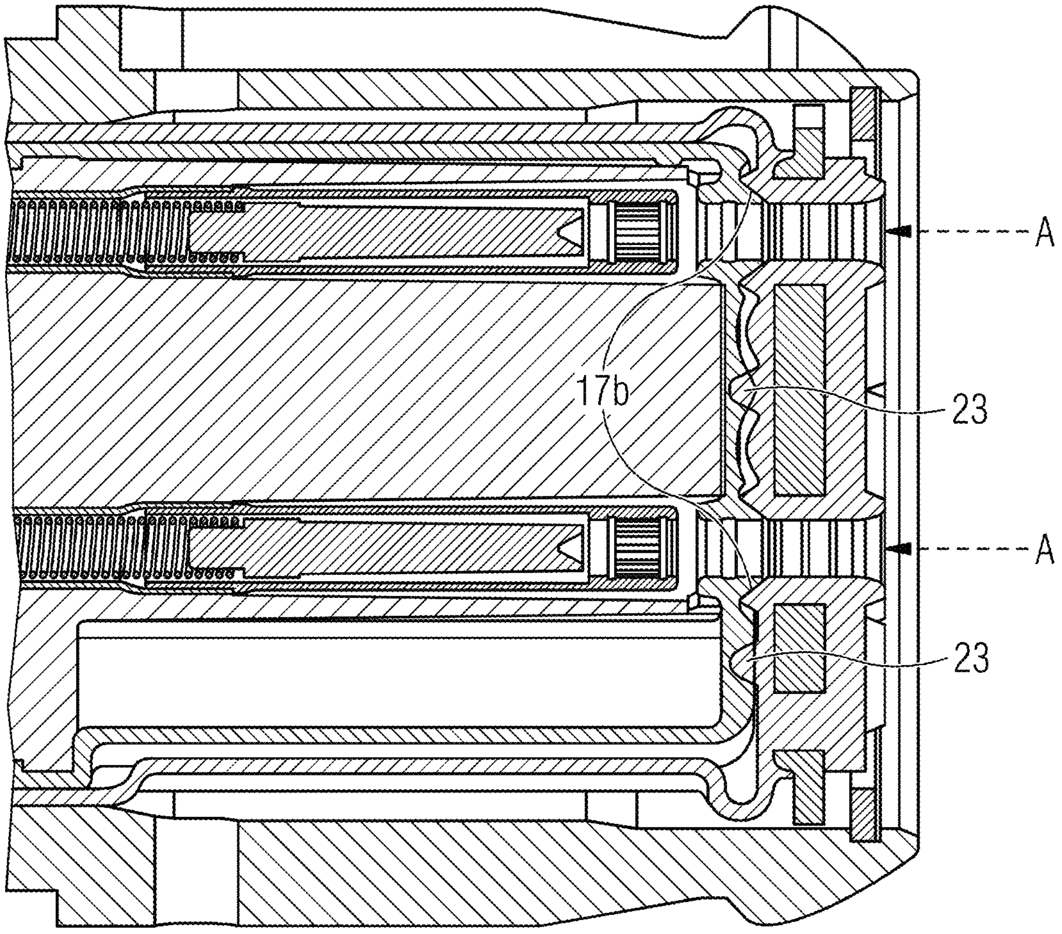
FIG. 5 illustrates compliant nested pin seals in the mated position, with the receptacle omitted for clarity.
Figure 6:
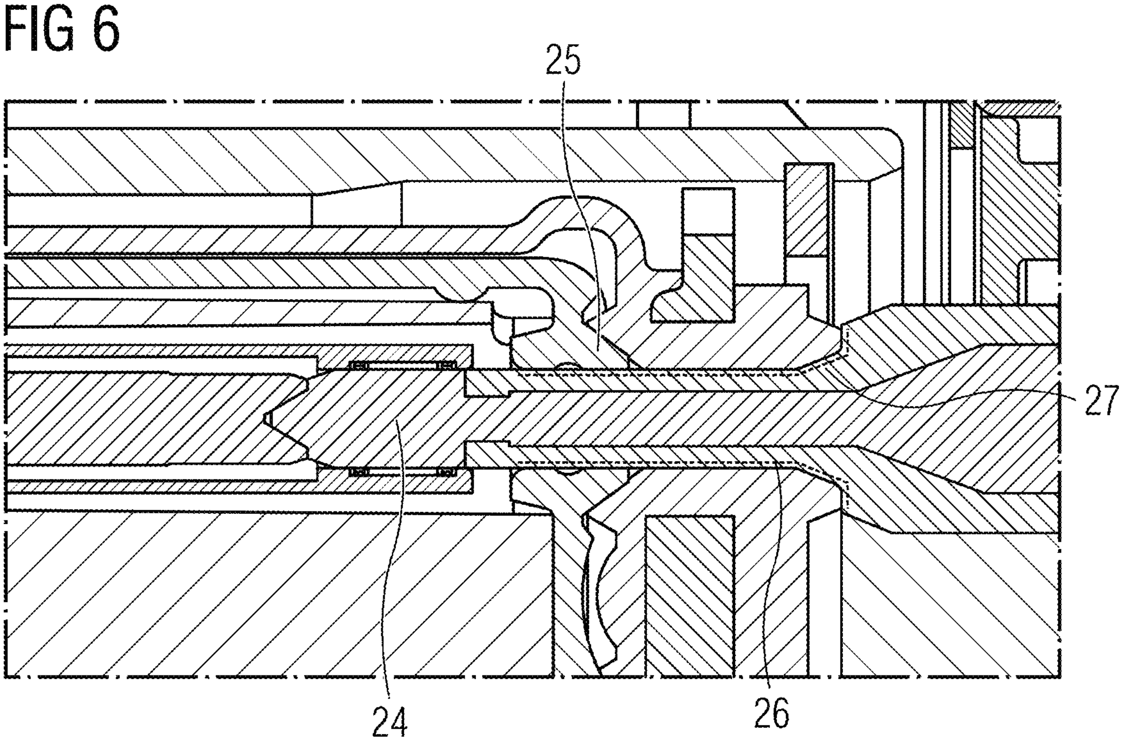
FIG. 6 illustrates how a continuous jacket is formed over the receptacle pin, in the mated position, with the receptacle present.

FIG. 5 illustrates the diaphragm seals after mating. The gap 17*b* between the front and back is closed by the effect of the receptacle pushing at points A, which causes the plug shuttle pins to be pushed back. A compliant elastomeric diaphragm cone spring, or return spring 23 is provided by the diaphragm at certain points on the diaphragms, away from the shuttle pin seals 12, 15 and the now closed gap 17*b*. More detail of the seals 12, 15 and interaction of the receptacle pin 24 and plug shuttle pin 10 is shown in FIG. 6. Cone profiles 25 of the primary diaphragm 16 create a good seal with a large surface area. When the plug and receptacle are mated, with the primary and secondary seals sealingly engaged, the receptacle pin 24 comprises a continuous silicone jacket 26 formed over the receptacle pin down to its root and a root cone seal protrusion 27 allows for connector mating overstroke.

Figure 7:
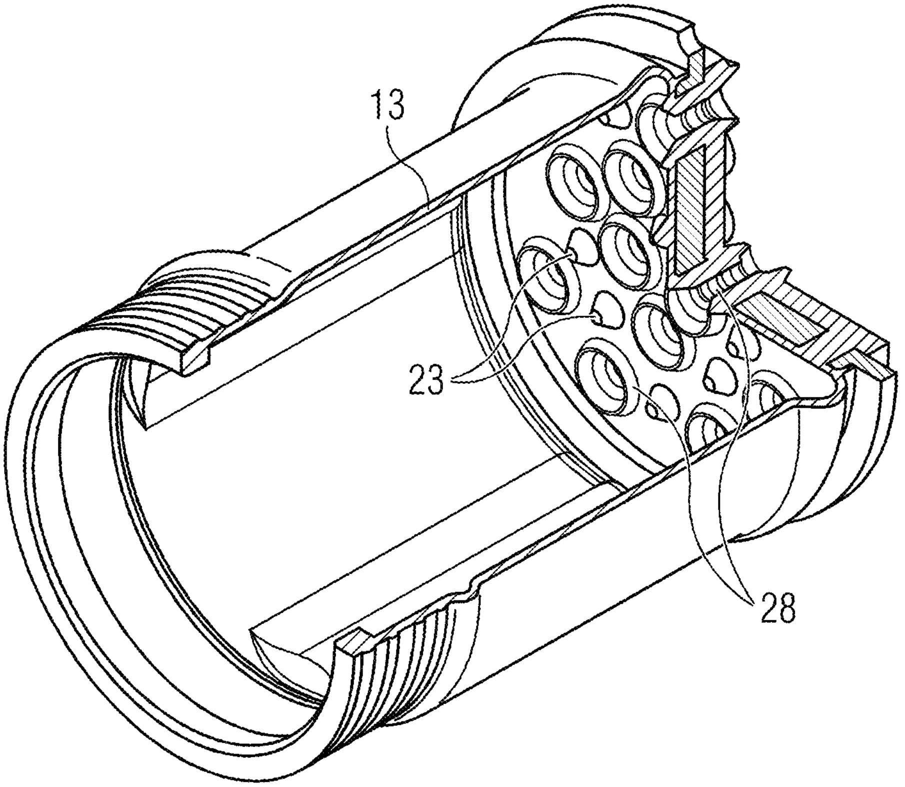
FIG. 7 illustrates more detail of a diaphragm for the plug of FIG. 2.

FIG. 7 illustrates the cone spring structure of the primary diaphragm, providing the return spring effect. The elastomeric cone springs 23 ensure the compliant diaphragm front is secure at its home position on de-mating. The cone springs work in conjunction with the partially supported front face of the secondary diaphragm (acting like a hammock) and friction with the receptacle pins 24 which drags the diaphragm seals 12, 15, in openings 28, outwards during a de-mate.

Figure 8:
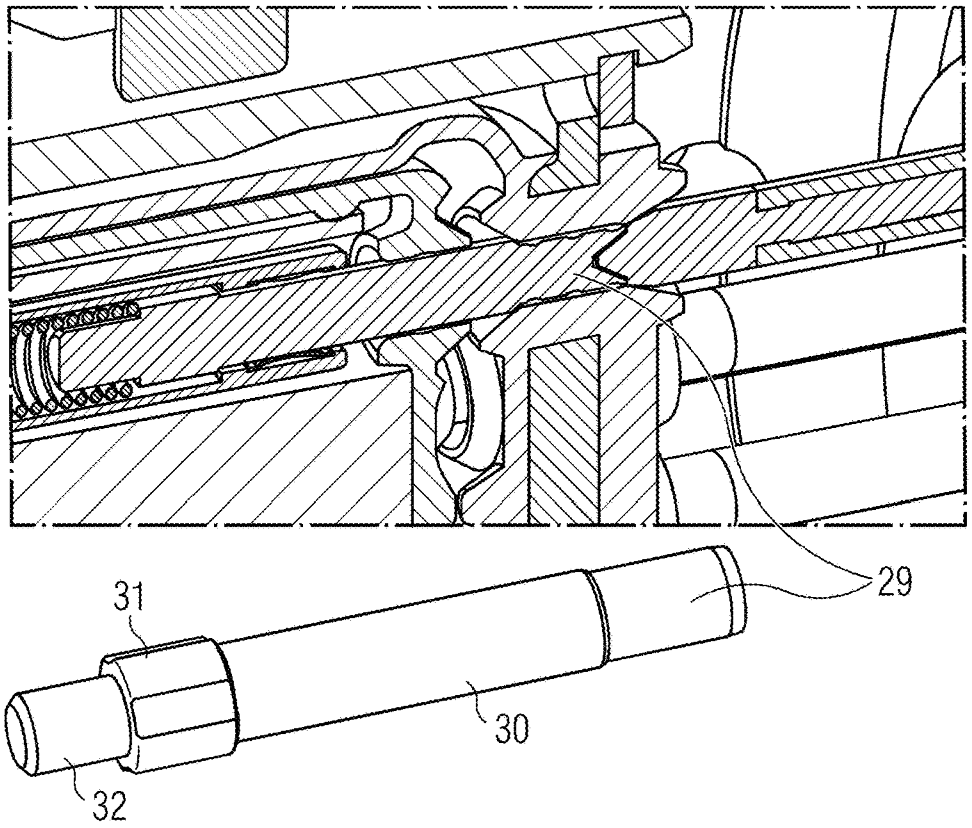
FIG. 8 illustrates features of the shuttle pin of FIG. 2 in more detail.

As previously mentioned, the profile of the shuttle pin varies along its length. FIG. 8 shows a step 29 on the shuttle pin to help ensure that the compliant diaphragm 13 is secure at its home position after a de-mate. Seal 15 of the secondary diaphragm 16 seals against a section 30 of slightly larger diameter which extends along a longer section of the shuttle pin. A fluted cylinder 31 towards the end of the shuttle pin remote from the seals helps to anchor the shuttle pin in the socket contact sub-assembly 18. This geometry helps minimise hydrodynamic drag as the shuttle pin moves through the oil. The final part 32 of the shuttle pin 10 has a reduced diameter to accommodate the shuttle pin spring 11.

Figure 9:
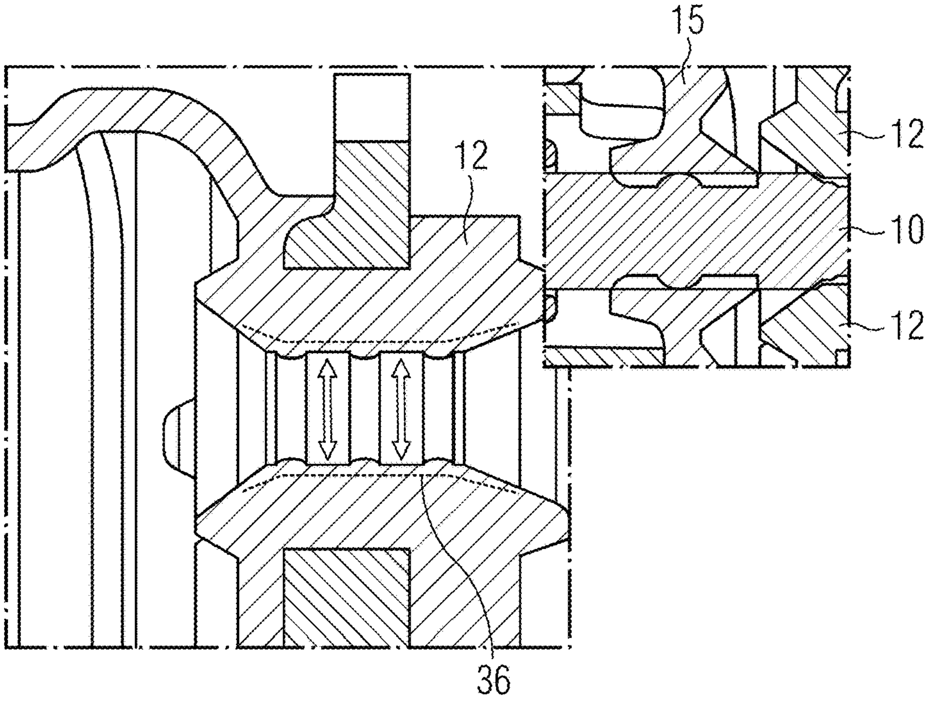
FIG. 9 illustrates more detail of the primary diaphragm of FIG. 2.
Figure 10:
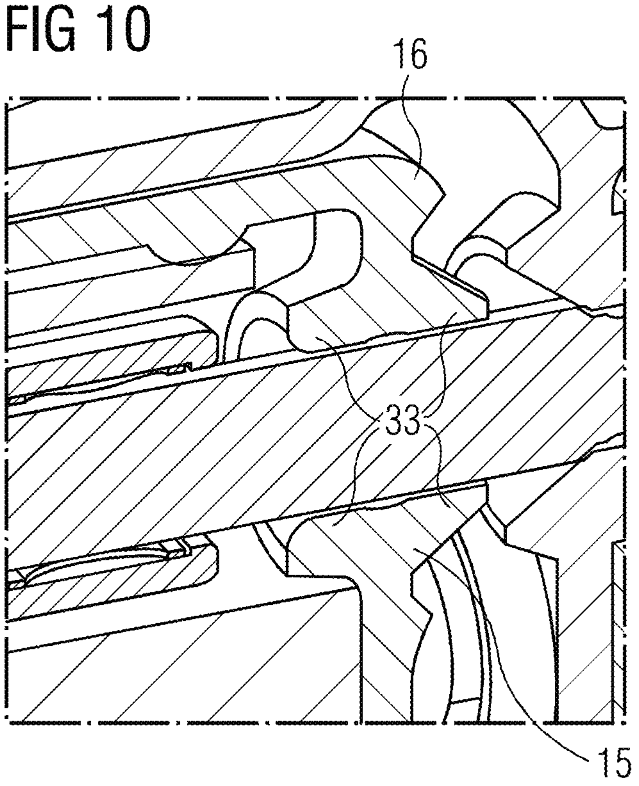
FIG. 10 illustrates more detail of the seal walls of the secondary diaphragm of FIG. 2
Figure 11:
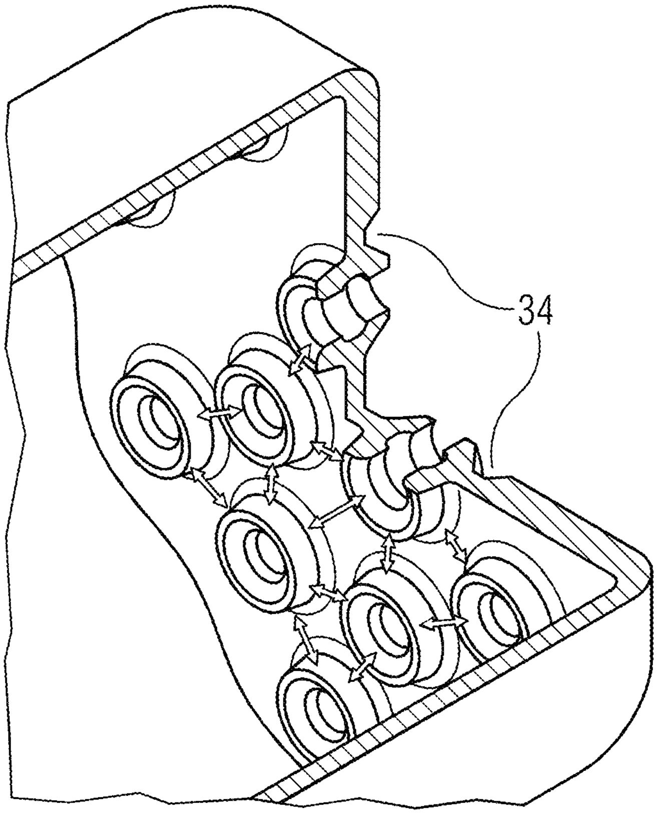
FIG. 11 shows further detail of the secondary diaphragm of FIG. 2.

FIG. 9 shows detail of the double taper angle in the front and rear cones, which ensures that the seal retains its desired conical shape when the shuttle pin is inserted into the seal bore. The profile 36 shown is that which the seal takes when the shuttle pin 10 is inserted, FIG. 10 illustrates how the outer and inner thin wall lips 33 of the secondary seal 15 of the secondary diaphragm comprise a central cavity design, which may take a Y, U, or C shape, to prevent packing of membrane between the seals 15 when the shuttle pin 10 is fitted, because the shuttle pin stretches the seal diameter outwards as the shuttle pin is fitted. Packing would impair the ability to seal to the shuttle pin and cause unwanted side forces, which may potentially displace the shuttle pin 10 off axis. FIG. 11 shows more detail of the secondary diaphragm 16. A thin secondary diaphragm front membrane 34 works in conjunction with the seal lips 33 to prevent packing between the seals 12, 15.

In the process of bringing the plug and receptacle together during mating, the front portion of the plug mates with the receptacle in such a way that a gap which is normally present between the secondary diaphragm of the plug with its seal, and the primary diaphragm of the plug and its seal onto the shuttle pin, is closed. As the front portion of the plug moves towards the receptacle and the two parts connect, the curvature in the diaphragms allows for outward movement to permit axial compression of the two parts. The front plate of the plug finally closes the gap and causes a seal to be formed between the primary and secondary diaphragm seals. This minimises the likelihood of seawater getting onto the receptacle pin 24 which has been inserted into the shuttle pin, through the diaphragm seals. The silicone jacket 26 formed around the pin is far less likely to suffer electrical stress if the seals are able to keep seawater away from the insulting material. Electrical stress is thus limited to a small section of the receptacle pin, outside the diaphragms. The conical geometry of the seals, with cones of silicone that act as a spring, ensure that the seals revert to their original shape when demating and so keep the water out. The step in the shuttle pin minimises friction of the shuttle pin returning through the front seals and helps to encourage the front plate forward. Pulling the pins back through the seals provides the force needed to get the primary diaphragm back to its original shape.

There are two different taper angles on the connector, so that when moulded the different taper angles conform to a single conical profile. The moulded seal openings are made slightly smaller than the diameter of the shuttle pin and are then stretched with the shuttle pin to get good seal of the material against the shuttle pin. The stretched seals deform into the shuttle pin shape. There is a cut away section to stop distortion of the hole positions relative to other holes and extra thickness on the outside makes the seals.

As the two diaphragms close up together, solid PEEK and silicone provide insulation around the pin of the receptacle. Using all solid insulation, rather than oil means that even if seawater contacts the insulation, it does not suffer from degradation. The seawater is effectively an electrical earth, which without that solid insulation might come into direct contact with the receptacle pin insulation, causing stress or electrical breakdown of the insulation. Solid insulation provides a much more stable performance, than oil, which degrades with time, as well as when exposed to seawater. This arrangement also has the advantage that the stroke length is reduced and so too, the receptacle pin length, thus, improving pin strength and simplifying manufacture.

The design protects the pin from electrical stress when connected, without the need for plating, which is difficult to achieve with small communication pins, by using stronger, more robust, insulation materials to exclude seawater from the pin and manage the electrical stress. A continuous jacket of silicone insulation is provided over the receptacle pin, down to the pin root at the PEEK moulded pin assembly by axially moving the primary seals into contact with the secondary seals during a plug and receptacle mating cycle. In a conventional connector, the primary and secondary seals have a permanent dielectric oil filled gap, irrespective of the mate positioning, contributing to the definition of two separate insulative barriers. In the present invention, the plug has the advantage of two separately sealed barriers, to reduce the likelihood of seawater burping into the plug during a mate, as well as the barriers wiping and closing the two seals into the form of a single silicone, typically tubular, barrier, which is independent for each pin. The design no longer relies on dielectric oil, which can reduce in performance through contamination by seawater ingress, during successive mate/de-mate cycles. Furthermore, conventionally, the connector has had to be qualified with the primary chamber flooded with seawater, which meant that the receptacle pin came into direct contact with sea water, thus raising the electrical stresses and likelihood of failure.

A compliant front diaphragm face facilitates primary or secondary seal closure into a continuous tube of silicone insulation around a receptacle pin, reducing reliance on the dielectric oil for reliable insulation. A conventional connector runs with a permanent oil filled gap between the seals. Over successive mate, de-mate cycles the seals can pass seawater which reduces effectiveness of the dielectric. The present invention incorporates integral elastomeric return springs, to prevent the compliant primary front from staying in a compressed position after a de-mate. Stepped diameters on the shuttle pins provide a back-up to the elastomeric return springs. By incorporating a compliant front face into the primary diaphragm and by facilitating tapered wall profiles into the facing primary and secondary diaphragm seals, a seals between seals, sealing effect is created as the primary diaphragm front face moves inwards towards the secondary diaphragm during a mate cycle. When un-mated, the dielectric oil filled gap between the primary and secondary seals allows the diaphragms 13, 16 to compensate normally during mate/de-mate cycling. The seals 12, 15 of the diaphragms bridge together towards the end of the mate stroke to form the continuous silicone jacket 26 over the receptacle pin 24 and the seals open up on de-mate. The speed of opening is assisted by frictional coupling of the seals with each receptacle pin, which drags the primary seals 12 axially outwards in synchronisation.

Conventionally, with a dual diaphragm arrangement, there has been a chamber formed between the primary and secondary diaphragms when the connector parts are de-mated, no way of closing that gap effectively during mating. In the present invention, the compliant front allows the gap to close to form the continuous jacket of silicone 26 around the receptacle pin when mated. This arrangement reduces reliance on dielectric oil for insulation, which can become contaminated with seawater through successive mate/de-mate cycles. The open/close action of the gap allows for full compensation/breathing of the diaphragms.

The cone seal geometry 25 at the sealing surfaces of the orifices bridges the gap 17*a*, 17*b* when compressed by the receptacle pin, so increasing the sealing area, whilst making inter-sealing less critical to the relative axial positioning of primary and secondary seals. The cone seal at the root of the receptacle pin, at the front of the primary diaphragm has a protrusion geometry to make provision for connector mating overstroke. The elastomeric cone springs 23 moulded into the primary diaphragm 13, or the secondary diaphragm, or both, help to return the front face to its home position during de-mate. These cone springs work in conjunction with a partially supported front face of the secondary diaphragm 16. Although the cone springs could be replaced by other types of energy storage spring, this design has the advantage that making it integral with another component reduces the overall part count and reduces costs. The shuttle pins have a diametrical step to assist in holding the primary diaphragm front face in open position after a de-mate. The primary diaphragm seal cones have a double taper angle to compensate for stretch/compression over shuttle pin whilst maintaining correct cone geometry. The primary diaphragm seals will not pack because of the provision of a support plate, which is not present in the secondary diaphragm. The secondary diaphragm seals have thin-walled lips with an integral void to prevent inter seal packing when the shuttle pin fitment causes diametrical stretch. This situation is also assisted by the front of the diaphragm being a thin membrane.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A subsea wet mateable connector, comprising:

a plug and a receptacle;

wherein the plug comprises a plug body and a shuttle pin moveably mounted in a socket contact;

wherein the receptacle comprises a receptacle body and a receptacle pin; and a secondary diaphragm mounted to the plug body; and a primary diaphragm mounted to the plug body outside the secondary diaphragm; wherein the primary diaphragm and the secondary diaphragm are spaced from one another by a gap in a demated state, allowing fluid flow in a space formed therebetween; and wherein in a mated state the primary diaphragm is moved axially until the gap is closed and the primary diaphragm and the secondary diaphragm are thereby sealingly engaged to each other and form a continuous protective layer in which both the primary diaphragm and the secondary diaphragm contact the receptacle pin.

2. The connector according to claim 1, wherein the shuttle pin is located within the plug body in the mated state and is sealing engaged with orifices in both of the primary and secondary diaphragms in the demated state.

3. The connector according to claim 1, wherein the profile of the shuttle pin is adapted to engage with a shoulder formed in a corresponding surface at least one of the primary diaphragm and of the secondary diaphragm.

4. The connector according to claim 1, wherein seals of the primary diaphragm comprise a double taper angle.

5. The connector according to claim 1, wherein seals of the secondary diaphragm comprise a pair of walls with an integral void.

6. The connector according to claim 1, wherein a primary dielectric fluid chamber is formed in the gap between the primary and secondary diaphragms in the demated state.

7. The connector according to claim 1, wherein a secondary dielectric fluid chamber is formed within the plug body.

8. The connector according to claim 1, wherein the primary diaphragm further comprises one or more compliant return springs.

9. The connector according to claim 2, wherein insertion of the receptacle pin into the shuttle pin during mating results in a continuous jacket being formed over the receptacle pin down to its root by engagement with surfaces of the primary and secondary diaphragms either side of the orifices.

10. The connector according to claim 1, wherein a root cone seal protrusion of the receptacle pin is adapted to engage with a surface of the primary diaphragm.

11. The connector according to claim 5, wherein the seals of the secondary diaphragm comprise the pair of walls with the integral void formed with a Y, U, or C shaped geometry.

12. The connector according to claim 8, wherein the one or more compliant return springs comprises elastomeric diaphragm cone springs.

13. The connector according to claim 1, wherein the primary diaphragm comprises a primary diaphragm through hole;

wherein the secondary diaphragm comprises a secondary diaphragm through hole;

wherein in the demated state the primary diaphragm through hole and the secondary diaphragm through hole each form a respective seal with the shuttle pin and the respective seals are disposed at a first distance from each other; and wherein in the mated state the primary diaphragm through hole and the secondary diaphragm through hole each form a respective seal with the receptacle pin and the respective seals are disposed at a second distance from each other that is less than the first distance.

14. The connector according to claim 1, wherein the primary diaphragm through hole and the secondary diaphragm through hole are disposed end to end with each other.

15. The connector according to claim 1, wherein an inside end of the primary diaphragm through hole comprises a female conical shape;

wherein an outside end of the secondary diaphragm through hole comprises a male conical shape; and wherein in the mated state the male conical shape fits into and seals with the female conical shape to sealingly engage the primary diaphragm with the secondary diaphragm.

* * * * *